United States Patent
Arai et al.

(10) Patent No.: US 9,951,468 B2
(45) Date of Patent: Apr. 24, 2018

(54) AQUEOUS INKJET INK SET FOR TEXTILE PRINTING AND METHOD FOR PRODUCING PRINTED ITEM

(71) Applicant: RISO KAGAKU CORPORATION, Tokyo (JP)

(72) Inventors: Sayako Arai, Ibaraki (JP); Yuki Urano, Ibaraki (JP); Shunsuke Uozumi, Ibaraki (JP); Hideki Imanishi, Ibaraki (JP); Takahisa Yamazaki, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/482,096

(22) Filed: Apr. 7, 2017

(65) Prior Publication Data

US 2017/0314194 A1    Nov. 2, 2017

(30) Foreign Application Priority Data

Apr. 28, 2016 (JP) ................. 2016-090313

(51) Int. Cl.
| | |
|---|---|
| *D06P 1/52* | (2006.01) |
| *D06P 5/30* | (2006.01) |
| *B41J 3/407* | (2006.01) |
| *B41J 2/01* | (2006.01) |

(52) U.S. Cl.
CPC ............... *D06P 1/5285* (2013.01); *B41J 2/01* (2013.01); *B41J 3/4078* (2013.01); *D06P 1/5257* (2013.01); *D06P 5/30* (2013.01)

(58) Field of Classification Search
CPC ........ D06P 1/5285; D06P 1/5257; D06P 5/30; B41J 2/01; B41J 3/4078
See application file for complete search history.

(56) References Cited

U.S. PATENT DOCUMENTS

| | | | |
|---|---|---|---|
| 8,814,335 B2 | 8/2014 | Inumaru et al. | |
| 2009/0226679 A1* | 9/2009 | Yatake | ................. C09D 11/322 428/195.1 |
| 2012/0327156 A1* | 12/2012 | Aruga | .................... B41J 3/4078 347/20 |

FOREIGN PATENT DOCUMENTS

| | | |
|---|---|---|
| JP | 2010-37700 A | 2/2010 |
| JP | 2013-95766 A | 5/2013 |
| JP | 5480446 B | 2/2014 |

* cited by examiner

*Primary Examiner* — Juanita D Jackson
(74) *Attorney, Agent, or Firm* — Hamre, Schumann, Mueller & Larson, P.C.

(57) ABSTRACT

An aqueous inkjet ink set for textile printing is disclosed, the aqueous inkjet ink set including two or more aqueous inkjet inks that include a black ink, wherein among the charge density Cd values measured by the streaming potential method for the two or more aqueous inkjet inks, the Cd value (CdK) for the black ink is the highest, and the absolute value of the difference between the Cd value (CdK) for the black ink and the Cd value (Cd2) for the aqueous inkjet ink having the second highest Cd value is 80 µeq/g or greater. A method for producing a printed item is also disclosed.

8 Claims, No Drawings

AQUEOUS INKJET INK SET FOR TEXTILE PRINTING AND METHOD FOR PRODUCING PRINTED ITEM

CROSS REFERENCE TO RELATED APPLICATIONS

This Application is based upon and claims the benefit of priority from prior Japanese Patent Application No. 2016-090313 filed on Apr. 28, 2016, the entire contents of which are incorporated by reference herein.

BACKGROUND OF THE INVENTION

Field of the Invention

An embodiment of the present invention relates to an aqueous inkjet ink set for textile printing and a method for producing a printed item.

Description of the Related Art

Among methods for printing images such as text, pictures or designs onto textiles or the like such as woven fabric and nonwoven fabric, in addition to screen printing methods and roller textile printing methods, inkjet textile printing methods which enable image processing to be performed by computer and textile printing to be performed in a substantially plateless manner are recently attracting considerable attention.

Inkjet printing enables non-contact variable data printing (VDP) to be performed, and is suited to small lot printing to any of various substrates. Inkjet printing is particularly beneficial for printing to textiles which are prone to substrate wrinkling or damage during contact printing. Further, from the viewpoints of safety and not impairing the inherent functionality of the substrate by printing, aqueous inks are ideal for printing to these types of substrates.

However, when an aqueous ink is printed onto a substrate such as a fabric, the dot shape may deform by following the fibers, and the ink may penetrate into voids between the fibers, causing feathering or a deterioration in print density. Moreover, color mixing also tends to occur in portions where different colors overlap, which can cause further deterioration in the image quality. Color mixing of black with other colors tends to be more likely to affect image quality. These tendencies tend to be particularly marked when printing fine text within a solid image, with text blurring and inadequate density often occurring.

JP 5,480,446 B discloses a method for suppressing color mixing and feathering by adhering, to a recording medium, a receiving solution prepared by dissolving or dispersing, in an aqueous solution, a specific divalent or higher metal salt and a resin having a hydrophilic group and/or a cationic or nonionic resin emulsion, and then printing, onto the region to which the receiving solution has been adhered, an aqueous ink in which a phosphorus-containing group having at least one P—O or P=O bond has been bound to the surface of a pigment (P) and/or the surface of an anionic resin emulsion (E).

JP 2010-37700 A discloses a method for printing to polyester fibers of a specific thickness, using an ink containing a glycol ether or a 1,2-alkanediol, and a water-soluble copolymer obtained by using an amine to neutralize and dissolve a copolymer obtained by using an unsaturated vinyl compound having a carboxyl group as a monomer component for copolymerization.

JP 2013-95766 A discloses a printing method that uses an aqueous ink containing an encapsulated pigment that has been coated with a resin containing a carboxyl group and a sulfate ester salt group, and a pretreatment liquid containing a polymer having an oxazoline group and a cationic substance.

SUMMARY OF THE INVENTION

According to an aspect of the present invention, an aqueous inkjet ink set for textile printing is provided, the aqueous inkjet ink set comprising two or more aqueous inkjet inks including a black ink, wherein among the charge density Cd values measured by the streaming potential method for the two or more aqueous inkjet inks, the Cd value (CdK) for the black ink is the highest, and the absolute value of the difference between the Cd value (CdK) for the black ink and the Cd value (Cd2) for the aqueous inkjet ink having the second highest Cd value is 80 µeq/g or greater.

According to another aspect of the present invention, a method for producing a printed item using the aqueous inkjet ink set for textile printing of the above aspect is provided, the method comprising printing the two or more aqueous inkjet inks onto a substrate using an inkjet recording method.

DESCRIPTION OF THE EMBODIMENT

In the methods disclosed in JP 5,480,446 B, JP 2010-37700 A and JP 2013-95766 A, specific substances are used as the components such as the pigments within the inks, and either a specific substrate is used as the print substrate, or a specific receiving solution or pretreatment liquid is used. However, when specific materials are used, some performance factors may often deteriorate. For example, the ink viscosity range may be restricted, the storage stability or discharge stability of the ink may be sacrificed, or costs may increase. Therefore, it is desirable that material restrictions which require the use of specific types of materials are kept to a minimum. Accordingly, the development of an inkjet ink set that places minimal restrictions on the types of components and the like is needed.

Accordingly, it is an object of some embodiments of the disclosure is to provide an aqueous inkjet ink set for textile printing with which, it is possible to produce a printed item having superior black color development, as well as reduced color mixing of black and other colors and reduced feathering.

The aqueous inkjet ink set for textile printing according to one embodiment of the present invention comprises two or more aqueous inkjet inks including at least a black ink, wherein among the charge density Cd values measured by the streaming potential method for the two or more aqueous inkjet inks, the Cd value (CdK) for the black ink is the highest, and the absolute value of the difference between the Cd value (CdK) for the black ink and the Cd value (Cd2) for the aqueous inkjet ink having the second highest Cd value is 80 µeq/g or greater.

The absolute value of the difference between the Cd value (CdK) for the black ink and the Cd value (Cd2) for the aqueous inkjet ink having the second highest Cd value is preferably 100 µeq/g or greater, and more preferably 110 µeq/g or greater.

The inventors of the present invention focused their attention on the fact that, in inks that contain particles having an electrical charge such as coloring material particles or water-dispersible resin particles, the mixing rate between adjacent dots sometimes slows when the difference in the charge density Cd values between the inks is large. The inventors discovered that in an inkjet ink set for textile printing constituted with two or more inks, if the black ink was the inkjet ink with the highest charge density, and the difference in the charge densities of the black ink and the inkjet ink having the second highest charge density was at least as high as a specific numerical value, then regardless of the types of materials used in the inks, satisfactory color development could be obtained, and color mixing between the black ink and the other colored inks could be suppressed. In this type of inkjet ink set for textile printing, it is thought that because the difference in the charge density values of the inks is large and the mixing rate is slow, the inks dry before color mixing can occur, enabling color mixing to be suppressed. Moreover, it is also thought that because excessive dot gain is suppressed as a result of the suppression of color mixing, runoff of coloring material into portions of other color and show-through can be suppressed, whereby the color development can be improved. It should be noted that that the present invention is not constrained by the specific theories mentioned above.

The charge density Cd value describes the charge density measured by the streaming potential method, and the charge density Cd value of an ink represents the amount of charge per unit of mass of the solid fraction of the ink (units: μeq/g). The "solid fraction" means the non-volatile fraction (active component(s)).

Specifically, the charge density (Cd value) measured by the streaming potential method is a value obtained by using a colloid particle charge analyzing system (Model CAS, manufactured by AFG Analytic GmbH) to measure a liquid obtained by diluting the ink to be measured 100-fold with ion-exchanged water, using a 0.0025 N poly(diallyldimethylammonium chloride) solution (manufactured by Wako Pure Chemical Industries, Ltd.) as the titrant.

There are no particular limitations on the method used for adjusting the charge density of an aqueous inkjet ink, and for example, the charge density can be adjusted by adjusting the quantity of counter ions for the ionic groups within the materials of the aqueous inkjet ink. Here, the "quantity of counter ions" indicates the quantity of ions per unit weight of particles. Generally, the charge density tends to increase as the quantity of counter ions per unit weight of particles increases. Adjusting the charge density of the aqueous inkjet ink by adjusting the quantity of counter ions in components such as the pigment and/or the water-dispersible resin is preferred, but the invention is not limited to this technique, and for example, the charge density may be adjusted by adding a dispersion assistant or the like, or by using a combination of methods. In this manner, the charge densities of the inks can be adjusted without any significant restrictions on the materials used.

[Aqueous Inkjet Ink Set for Textile Printing]

In embodiments, the aqueous inkjet ink set for textile printing is constituted with two or more aqueous inkjet inks. These two or more aqueous inkjet inks include at least a black ink.

Embodiments of the aqueous inkjet inks included in the aqueous inkjet ink set for textile printing are described below.

[Aqueous Inkjet Inks]

Although there are no particular limitations on the components of the aqueous inkjet inks included in the aqueous inkjet ink set for textile printing, in embodiments, the aqueous inkjet inks included in the aqueous inkjet ink set for textile printing preferably contain a coloring material, a water-dispersible resin and water.

<Coloring Material>

In embodiments, each of the aqueous inkjet inks included in the aqueous inkjet ink set for textile printing preferably contains a coloring material. There are no particular limitations on the coloring material, but a pigment is preferred. Any of the pigments typically used in this technical field may be used.

A white pigment may be used in a white ink, and a color pigment other than white may be used in a colored ink.

Specific examples of color pigments that may be used include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue and aniline black); inorganic pigments, examples of which include metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. The average particle size of the color pigment is preferably from 50 to 500 nm, and more preferably from 50 to 200 nm. If the average particle size of the color pigment is less than 50 nm, then the color development may sometimes be unsatisfactory, whereas if the average particle size exceeds 500 nm, the discharge stability may be unsatisfactory.

Specific examples of white pigments include inorganic pigments such as titanium oxide, zinc oxide, zinc sulfide, antimony oxide and zirconium oxide. Examples of white pigments other than inorganic pigments include, hollow resin microparticles and polymer microparticles. Among these, from the viewpoint of hiding power, the use of titanium oxide is preferred. The average particle size of the titanium oxide is preferably from 100 to 500 mn. If the average particle size is less than 50 nm, then the hiding properties may be unsatisfactory, whereas if the average particle size exceeds 500 nm, then the discharge stability may be unsatisfactory. In those cases where titanium oxide is used, in order to suppress any photocatalytic action, it is preferable to use titanium oxide that has been surface treated with alumina or silica. The amount of this surface treatment preferably represents about 5 to 20% by weight of the pigment.

These pigments may be used individually, or combinations of two or more pigments may be used.

The amount added of the pigment may vary depending on the type of pigment used, but from the viewpoint of ensuring satisfactory color development and the like, the ink preferably contains about 1 to 30% by weight, and more preferably 1 to 15% by weight, of the pigment.

A conventional pigment dispersant typified by polymeric dispersants and surfactants is preferably used to ensure stable dispersion of the pigment in the ink.

Examples of commercially available polymeric dispersants include the TEGO DISPERS series manufactured by Evonik Industries AG (examples of which include TEGO DISPERS 740W, TEGO DISPERS 750W, TEGO DISPERS 755W, TEGO DISPERS 757W and TEGO DISPERS 760), the SOLSPERSE series manufactured by The Lubrizol Corporation (examples of which include SOLSPERSE 20000, SOLSPERSE 27000, SOLSPERSE 41000, SOLSPERSE 41090, SOLSPERSE 43000, SOLSPERSE 44000 and SOLSPERSE 46000), the JONCRYL series manufactured by Johnson Polymer, Inc. (examples of which include JONCRYL 57, JONCRYL 60, JONCRYL 62, JONCRYL 63, JONCRYL 71 and JONCRYL 501), as well as DISPERBYK-102, DISPERBYK-185, DISPERBYK-190, DISPERBYK-193 and DISPERBYK-199 manufactured by BYK Additives & Instruments GmbH, FUJI SP A-54 manufactured by Fuji Pigment Co., Ltd., and Polyvinylpyrrolidone K-30 and Polyvinylpyrrolidone K-90 manufactured by Dai-ichi Kogyo Seiyaku Co., Ltd.

Examples of the surfactants include anionic surfactants such as the DEMOL series manufactured by Kao Corporation (examples of which include DEMOL EP, DEMOL N, DEMOL RN, DEMOL NL, DEMOL RNL and DEMOL T-45), and nonionic surfactants such as the EMULGEN series manufactured by Kao Corporation (examples of which include EMULGEN A-60, EMULGEN A-90, EMULGEN A-500, EMULGEN B-40, EMULGEN L-40 and EMULGEN 420).

Two or more kinds of these pigment dispersants may also be used in combinations.

When used, there are no particular limitations on the amount of the pigment dispersant added to the ink, which may vary depending on the type of pigment dispersant used, but generally, the amount of the pigment dispersant (as the amount of the active component (solid fraction)), reported as a weight ratio relative to a value of 1 for the amount of the pigment (as the amount of the active component (solid fraction)), is preferably within a range from 0.005 to 0.5.

A self-dispersing pigment in which the pigment surface has been modified with hydrophilic functional groups may be used. Examples of commercially available self-dispersing pigments include the CAB-O-JET series manufactured by Cabot Corporation (examples of which include CAB-O-JET 200, CAB-O-JET 300, CAB-O-JET 250C, CAB-O-JET 260M and CAB-O-JET 270C), and the products BONJET BLACK CW-1S, CW-3, CW-3, CW-4, CW-5 and CW-6 manufactured by Orient Chemical Industries, Ltd.

A microencapsulated pigment in which a pigment is coated with a resin may be used.

<Water-Dispersible Resin>

The aqueous inkjet inks included in the aqueous inkjet ink set for textile printing of the present embodiment preferably contain a water-dispersible resin.

The expression "water-dispersible resin" describes a resin which does not dissolve in water, and is dispersible in water in particulate form.

There are no particular limitations on the water-dispersible resin, but from the viewpoint of inkjet dischargeability, a resin having an average particle size of 300 nm or less is preferred.

The amount of the water-dispersible resin (as the amount of the active component (solid fraction)) in the aqueous inkjet ink is preferably from 0.5 to 20.0% by mass, and more preferably from 2 to 10.0% by mass.

From the viewpoints of the adhesiveness to substrates and the durability of the printed portions, the aqueous inkjet inks preferably include a water-dispersible urethane resin and either a water-dispersible (meth)acrylic resin or a water-dispersible styrene/(meth)acrylic resin, and it is particularly desirable that all of the aqueous inkjet inks included in the aqueous inkjet ink set for textile printing each comprises a water-dispersible urethane resin and at least one water-dispersible resin selected from the group consisting of water-dispersible (meth)acrylic resins and water-dispersible styrene/(meth)acrylic resins.

There are no particular limitations on the water-dispersible urethane resin, provided it has a urethane skeleton and is water-dispersible, but, from the viewpoint of material compatibility with the inkjet head, anionic urethane resins having anionic functional groups such as carboxyl groups, sulfo groups or hydroxyl groups are preferred.

Specific examples of water-dispersible urethane resins include SUPERFLEX 150, SUPERFLEX 300, SUPERFLEX 460, SUPERFLEX 460S and SUPERFLEX 840 manufactured by Dai-ichi Kogyo Seiyaku Co., Ltd., TAKELAC WS-6021 and TAKELAC W-512-A-6 manufactured by Mitsui Chemicals, Inc., ADEKA BONTIGHTER HUX-370 and ADEKA BONTIGHTER HUX-380 manufactured by ADEKA Corporation, and NEOREZ R-9660, NEOREZ R-966, NEOREZ R-986 and NEOREZ R-2170 manufactured by DSM N.V. These products are anionic resins having a urethane skeleton.

Examples of other resins that may be used as the water-dispersible urethane resin include polyether-type urethane resins that include ether bonds within the main chain besides the urethane bonds, polyester-type urethane resins that include ester bonds within the main chain besides the urethane bonds, and polycarbonate-type urethane resins that include carbonate bonds within the main chain besides the urethane bonds. Of these, preferable examples include polycarbonate-type urethane resins and polyester-type urethane resins.

Combinations of a plurality of these water-dispersible urethane resins may also be used.

There are no particular limitations on the water-dispersible styrene/(meth)acrylic resins and water-dispersible (meth)acrylic resins, and commercially available products may be used.

Examples of commercially available water-dispersible styrene/(meth)acrylic resins and water-dispersible (meth)acrylic resins include MOWINYL 966A, MOWINYL 6750, MOWINYL 6751D, MOWINYL 6960, MOWINYL 6718 and MOWINYL 7320 manufactured by The Nippon Synthetic Chemical Industry Co., Ltd., MICROGEL E-1002 and MICROGEL E-5002 manufactured by Nippon Paint Co., Ltd., VONCOAT 4001 and VONCOAT 5454 manufactured by DIC Corporation, SAE1014 manufactured by Zeon Corporation, SAIVINOL SK-200 manufactured by Saiden Chemical Industry Co., Ltd., NEOCRYL BT-62 and NEOCRYL SA-1094 manufactured by DSM Coating Resins D.V., JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780 and JONCRYL 7610 manufactured by BASF Corporation, and NK Binder R-5HN manufactured by Shin-Nakamura Chemical Co., Ltd.

<Water>

In embodiments, the aqueous inkjet inks included in the aqueous inkjet ink set for textile printing preferably contain water. There are no particular limitations on this water, but water in which the amount of ion components is as low as possible is preferred. In particular, from the viewpoint of the ink storage stability, the amount of polyvalent metal ions such as calcium ions is preferably kept low. Examples of the water include ion-exchanged water, distilled water and ultra-pure water.

From the viewpoint of viscosity regulation, the amount of water in each aqueous inkjet ink is preferably from 20 to 80% by mass, and more preferably from 30 to 70% by mass.

<Water-Soluble Solvent>

In embodiments, the aqueous inkjet inks included in the aqueous inkjet ink set for textile printing may include a water-soluble solvent, provided the effects of the aqueous inkjet ink set are not impaired.

From the viewpoints of viscosity regulation and moisture retention, a water-soluble organic solvent that is liquid at room temperature and is soluble in water is preferred. Specific examples of water-soluble solvents that may be used include lower alcohols such as methanol, ethanol, 1-propanol, isopropanol, 1-butanol, 2-butanol, isobutanol, 1,3-propanediol, 1,2-hexanediol and 2-methyl-2-propanol; glycols such as ethylene glycol, diethylene glycol, triethylene glycol, tetraethylene glycol, pentaethylene glycol, propylene glycol, dipropylene glycol and tripropylene glycol; glycerol; acetins (monoacetin, diacetin and triacetin); glycol derivatives such as triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether and tetraethylene glycol diethyl ether; as well as triethanolamine, 1-methyl-2-pyrrolidone, β-thiodiglycol and sulfolane. Examples of water-soluble solvents that may be used further include low-molecular weight polyalkylene glycols. Specific examples thereof include polyethylene glycols having an average molecular weight within a range from 190 to 630, such as an average molecular weight of 200, 300, 400 or 600, diol-type polypropylene glycols having an average molecular weight within a range from 200 to 600, such as an average molecular weight of 400, and triol-type polypropylene glycols having an average molecular weight within a range from 250 to 800, such as an average molecular weight of 300 or 700.

These water-soluble organic solvents may be used individually, or combinations of two or more different solvents may be used.

From the viewpoints of viscosity regulation and moisture retention, the amount of the water-soluble organic solvent within the ink is preferably from 1 to 80% by mass, and more preferably from 10 to 60% by mass.

<Other Components>

In embodiment, in addition, the aqueous inkjet inks included in the aqueous inkjet ink set for textile printing may also contain suitable amounts of one or more additional components, provided the effects of the aqueous inkjet ink set are not impaired. Examples of additional components include dispersion assistants, humectants (moisture retention agents), surface tension regulators (surfactants), fixing agents, pH modifiers, antioxidants, preservatives, and crosslinking agents and the like.

Here, the term "dispersion assistants" describes dispersants that are added to pigment dispersions that have already been dispersed, and typical dispersants may be used as these dispersion assistants. Examples of commercially available products that may be used include the products mentioned above as examples of pigment dispersants.

Examples of the humectants which may be used include polyhydric alcohols.

Examples of the surface tension regulators which may be used include anionic surfactants, cationic surfactants, amphoteric surfactants and nonionic surfactants. Examples of the surfactants which may be used also include polymer-based surfactants, silicone-based surfactants and fluorine-based surfactants.

Adding a surfactant may facilitate the stable discharge of the ink by an inkjet method, and also may make it easier to appropriately control the penetration of the ink, and is consequently preferred. The amount added of the surfactant (the total amount of surfactant in those cases when the surfactant is also used as a pigment dispersant) may vary depending on the type of surfactant used, but from the viewpoints of the ink surface tension and the rate of ink penetration into substrates such as fabrics, the amount is preferably within a range from 0.1 to 10% by weight of the ink.

Specific examples of the anionic surfactants include the EMAL series (examples of which include EMAL 0, EMAL 10, EMAL 2F, EMAL 40 and EMAL 20C), the NEOPELEX series (examples of which include NEOPELEX GS, NEOPELEX G-15, NEOPELEX G-25 and NEOPELEX G-65), the PELEX series (examples of which include PELEX OT-P, PELEX TR, PELEX CS, PELEX TA, PELEX SS-L and PELEX SS-H), and the DEMOL series (examples of which include DEMOL N, DEMOL NL, DEMOL RN and DEMOL MS), all manufactured by Kao Corporation.

Examples of the cationic surfactants include the ACETAMIN series (examples of which include ACETAMIN 24 and ACETAMIN 86), the QUARTAMIN series (examples of which include QUARTAMIN 24P, QUARTAMIN 86P, QUARTAMIN 60W and QUARTAMIN 86W), and the SANISOL series (examples of which include SANISOL C and SANISOL B-50), all manufactured by Kao Corporation.

Examples of the nonionic surfactants include acetylene glycol-based surfactants, such as the SURFYNOL series manufactured by Air Products and Chemicals, Inc. (examples of which include SURFYNOL 104E, SURFYNOL 104H, SURFYNOL 420, SURFYNOL 440, SURFYNOL 465 and SURFYNOL 485) and OLFINE E1004, OLFINE E1010 and OLFINE E1020 manufactured by Nissin Chemical Industry Co., Ltd., and polyoxyethylene alkyl ether-based surfactants, such as the EMULGEN series manufactured by Kao Corporation (examples of which include EMULGEN 102KG, EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705, EMULGEN 707, EMULGEN 709, EMULGEN 1108, EMULGEN 4085 and EMULGEN 2025G).

Examples of the amphoteric surfactants include the AMPHITOL series manufactured by Kao Corporation (examples of which include AMPHITOL 20BS, AMPHITOL 24B, AMPHITOL 86B, AMPHITOL 20YB and AMPHITOL 20N).

An electrolyte may also be added to the ink to adjust the viscosity or pH of the ink. Examples of the electrolyte include sodium sulfate, potassium hydrogen phosphate, sodium citrate, potassium tartrate and sodium borate. Two or more electrolytes may be used in combination. Examples of compounds which may be used as an ink thickening assistant or a PH modifier include sulfuric acid, nitric acid, acetic acid, sodium hydroxide, potassium hydroxide ammonium hydroxide and triethanolamine.

By adding an antioxidant, oxidation of the ink components can be prevented, and the storage stability of the ink can be improved. Examples of antioxidants that may be used include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented, and the storage stability of the ink can be improved. Examples of preservatives that may be used include isothiazolone-based preservatives such as 5-chloro- 2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

By using a crosslinking agent, powerful linkages can be formed between resin molecules and/or between the resin and the coloring material, thereby reducing the likelihood of cohesive failure.

Examples of the crosslinking agent include blocked isocyanate-based compounds, which promote crosslinking under heating. The amount of the blocked isocyanate-based compound is preferably a mass ratio of 0.1 to 3% relative to the resin solid fraction. From the viewpoint of the storage stability, the amount is preferably not more than 3%, whereas from the viewpoint of the crosslinking effect, the amount is preferably at least 0.1%.

A blocked isocyanate-based compound is a compound in which the isocyanate group is protected with a blocking agent that dissociates upon heating, thus regenerating the active isocyanate group. It is thought that the isocyanate group generated by this heating reacts with the active hydrogen regions on the substrate such as a fabric, thereby forming crosslinked structures such as urethane linkages and urea linkages. Examples of the blocking agent include phenol-based compounds, aromatic secondary amine compounds, cyclic amine compounds, lactam compounds, oxime compounds and sodium sulfite.

More specifically, the blocked isocyanate-based compound is preferably a compound having a urethane skeleton. Examples of commercially available products that may be used include the various products of the ELASTRON series and ELASTRON BN series manufactured by Dai-ichi Kogyo Seiyaku Co., Ltd., and particularly preferred examples include ELASTRON E37, ELASTRON H-3, ELASTRON C-52, ELASTRON MF25, ELASTRON W-22, ELASTRON S-24, ELASTRON BN-08, ELASTRON BN-11, ELASTRON BN-27, ELASTRON BN-45, ELASTRON BN-69 and ELASTRON BN-77.

<Physical Properties of Aqueous Inkjet Inks>

In embodiments, the viscosity of each of the aqueous inkjet inks may be adjusted as appropriate, but from the viewpoint of the discharge properties, is preferably from 1 to 30 mPa·s. This viscosity describes the ink viscosity at 3 Pa when the shear stress is increased from 0 Pa at a rate of 0.1 Pa/s at a temperature of 23° C.

In embodiments, the surface tension of each of the aqueous inkjet inks is preferably from 30 to 50 mN/m at 25° C. In order to control the ink penetration, a method may be used in which the surface tension of the ink is controlled to adjust the rate of penetration of the ink into the substrate. When the surface tension of the ink is from 30 to 50 mN/m, a favorable ink penetration rate may facilitate the formation of an ink film, and favorable dischargeability of the ink from the inkjet nozzles may also be obtained more easily.

<Substrate>

In embodiments, with the aqueous inkjet ink set for textile printing, a fabric can be used favorably as the substrate that represents the printing target. Examples of fabrics that may be used include fabrics formed from any natural and/or synthetic fibers such as cotton, silk, wool, hemp, nylon, polyester, rayon, acetate and cupra. Further, the fabric is not limited to woven fabrics that use these natural and/or synthetic fibers, and knitted fabrics and the like may also be used.

[Method for Producing Printed Item]

A method for producing a printed item using the aqueous inkjet ink set for textile printing according to an embodiment of the invention is described below.

There are no particular limitations on the method for producing a printed item using the aqueous inkjet ink set for textile printing. The aqueous inkjet inks of the aqueous inkjet ink set for textile printing of an embodiment of the invention may be printed onto the substrate such as a fabric using an inkjet recording method. The inkjet printer used may employ any of various systems, including a piezo system, electrostatic system or thermal system, and for example, each of the aqueous inkjet inks may be discharged from an inkjet head based on a digital signal, and the discharged ink droplets are adhered to the substrate.

In embodiments, in the method for producing a printed item using the aqueous inkjet ink set for textile printing, a process of applying a pretreatment liquid to at least the print region of the substrate surface may be performed prior to performing printing using the aqueous inkjet inks. The region to which the pretreatment liquid is applied may be the entire substrate surface, including the print region.

The amount applied of the pretreatment liquid, per unit area of the substrate, may be preferably from 1 to 500 $g/m^2$, and more preferably from 10 to 200 $g/m^2$.

When any of the aqueous inkjet inks contains a water-dispersible resin, a heat treatment is preferably performed after the aqueous inkjet ink is printed onto the substrate. This may facilitate drying of the ink, and may cause the water-dispersible resin to form a film, making it easier to form a strong ink film. There are no particular limitations on the heat treatment conditions, but the treatment is preferably performed at, for example, a temperature of about 100 to 180° C. For example, the heat treatment may be performed at 160° C. for about 60 seconds.

<Pretreatment Liquid>

In embodiments, in the method for producing a printed item using the aqueous inkjet ink set for textile printing, a pretreatment liquid may be used as described above. There are no particular limitations on the pretreatment liquid, and examples include liquids containing a coagulant such as a metal salt or cationic resin, or a filler such as silica. From the viewpoint of color development, a pretreatment liquid containing a metal salt is preferred. From the viewpoints of image fastness and color development, the coating amount of the pretreatment liquid is preferably adjusted to provide a weight of coagulant of 3 to 15 $g/m^2$.

Examples of metal salts that may be used as coagulants in the pretreatment liquid include polyvalent metal salts. Examples of these polyvalent metal salts include salts of metals such as calcium, magnesium, copper, nickel, zinc and barium, but in those cases where the pretreatment liquid is sprayed onto the substrate such as a fabric and then fixed using an iron, the pretreatment liquid itself is preferably colorless, and considering the likelihood of the fabric contacting the skin or the like, an inert calcium salt is particularly preferred.

From the viewpoint of the ink film formation and fixing properties, the concentration of the polyvalent metal salt in the pretreatment liquid is preferably about 1 to 25% by mass, and more preferably about 5 to 15% by mass.

From the viewpoints of reducing fluff formation on the substrate and improving the ink fixing properties, the pretreatment liquid preferably includes a water-dispersible resin. There are no particular limitations on the water-dispersible resin, and examples of resins that may be used include acrylic resins, acrylic/styrene resins, urethane resins, vinyl acetate resins, acrylic/vinyl acetate resins, and combinations of two or more of these resins. Specific examples include SUPERFLEX 107M, SUPERFLEX 300, SUPERFLEX 361, SUPERFLEX E2000, SUPERFLEX E4000 and SUPERFLEX E4800 from the SUPERFLEX series manufactured by Dai-ichi Kogyo Seiyaku Co., Ltd., ADEKA BONTIGHTER HUX-950 and ADEKA BONTIGHTER HUX-290H from the ADEKA BONTIGHTER series manufactured by ADEKA Corporation, as well as TAKELAC W-512A6 manufactured by Mitsui Chemicals, Inc., and VINYBLAN 1225 and VINYBLAN 1245L manufactured by Nissin Chemical Industry Co., Ltd. These resins may be used individually, or a plurality of resins may be used in combination.

In order to ensure a satisfactory effect, the amount of the water-dispersible resin relative to the total mass of the pretreatment liquid is preferably from 1 to 20% by mass.

Although there are no particular limitations on the water which may be included in the pretreatment liquid, a water in which the amount of impurities is small is preferred, and examples include pure water or ultrapure water such as ion-exchanged water or distilled water. There are no particular limitations on the amount of water, but from the viewpoint of viscosity regulation, the amount is preferably adjusted as appropriate.

From the viewpoints of viscosity regulation and moisture retention, a water-soluble organic solvent may be added. Examples of water-soluble organic solvents that may be used in the pretreatment liquid include the water-soluble organic solvents as those mentioned above for inclusion in the aqueous inkjet inks.

In addition, the pretreatment liquid may include one or more additives. Examples thereof include additives which may be typically used in inks. Examples of additives include preservatives, viscosity regulators, antioxidants and surfactants. Examples of these additives include the additives as those mentioned above for addition to the aqueous inkjet inks.

EXAMPLES

The present invention is described below in further detail using a series of examples, but the present invention is in no way limited by these examples.
[Preparation of Aqueous Inkjet Inks]
<Preparation of Pigment Dispersions>
(Preparation of Black (K) Pigment Dispersion)
First, 100 g of a pigment #960 (a black pigment, manufactured by Mitsubishi Chemical Corporation) and 50 g of TEGO Dispers 750W (a polymeric dispersant, manufactured by Evonik Industries AG) as a dispersant were mixed with 800 g of ion-exchanged water, and a beads mill containing ø0.5 mm zirconia beads was used to disperse the mixture to obtain a black pigment dispersion.
(Preparation of Cyan (C) Pigment Dispersion)
First, 90 g of a pigment FASTOGEN BLUE TGR (a cyan pigment, manufactured by DIC Corporation) and 51.4 g of TEGO Dispers 760W (a styrene/maleic acid-based dispersant, manufactured by Evonik Industries AG) as a dispersant were mixed with 800 g of ion-exchanged water, and a beads mill containing ø0.5 mm zirconia beads was used to disperse the mixture to obtain a cyan pigment dispersion.
(Preparation of Magenta (M) Pigment Dispersion)
First, 90 g of a pigment CINQUASIA Magenta D4550J (a magenta pigment, manufactured by BASF Corporation) and 45 g of TEGO Dispers 757W (a polymeric dispersant, manufactured by Evonik Industries AG) as a dispersant were mixed with 800 g of ion-exchanged water, and a beads mill containing ø0.5 mm zirconia beads was used to disperse the mixture to obtain a magenta pigment dispersion.
(Preparation of Yellow (Y) Pigment Dispersion)
First, 90 g of a pigment Inkjet Yellow 4GP (a yellow pigment, manufactured by Clariant AG) and 51.4 g of TEGO Dispers 760W as a dispersant were mixed with 800 g of ion-exchanged water, and a beads mill containing ø0.5 mm zirconia beads was used to disperse the mixture to obtain a yellow pigment dispersion.
(Preparation of White (W) Pigment Dispersion)
First, 250 g of a white pigment R-21N (titanium oxide, manufactured by Sakai Chemical Industry Co., Ltd.) and 10 g of DEMOL EP (a polycarboxylate polymeric surfactant, manufactured by Kao Corporation) as a dispersant were mixed with 740 g of ion-exchanged water, and a beads mill containing ø0.5 mm zirconia beads was used to disperse the mixture to obtain a white (W) pigment dispersion.
<Preparation of Aqueous Inkjet Inks>
The materials shown in Tables 1 and 2 were mixed in the mass ratios shown in Tables 1 and 2, and the resulting mixtures were each filtered through a 3 μm membrane filter to remove coarse particles, thus obtaining inks 1 to 17 as aqueous inkjet inks. In the preparation of inks 7, 8, 11, 16 and 17, the pigment dispersions prepared above were used.

Inks 1 to 7 are black (K) inks, inks 8 to 10 are cyan (C) inks, inks 11 to 13 are magenta (M) inks, inks 14 to 16 are yellow (Y) inks, and ink 17 is a white (W) ink.

The materials shown in Tables 1 and 2 are listed below. In Tables 1 and 2, numerical values without units indicate parts by mass.
BONJET BLACK CW-6: a carbon black self-dispersible pigment dispersion, manufactured by Orient Chemical Industries, Ltd.
BONJET BLACK CW-2: a carbon black self-dispersible pigment dispersion, manufactured by Orient Chemical Industries, Ltd.
CAB-O-JET 450C, a cyan self-dispersible pigment dispersion manufactured by Cabot Corporation
CAB-O-JET 465M, a magenta self-dispersible pigment dispersion manufactured by Cabot Corporation
CAB-O-JET 260M, a magenta self-dispersible pigment dispersion manufactured by Cabot Corporation
CAB-O-JET 270Y, a yellow self-dispersible pigment dispersion manufactured by Cabot Corporation
CAB-O-JET 470Y, a yellow self-dispersible pigment dispersion manufactured by Cabot Corporation
960: a black pigment (carbon black) manufactured by Mitsubishi Chemical Corporation
FASTOGEN Blue TGR: a cyan pigment manufactured by DIC Corporation
CINQUASIA Magenta D4550J: a magenta pigment manufactured by BASF Corporation
Inkjet Yellow 4GP, a yellow pigment manufactured by Clariant Corporation
R-21N: titanium oxide manufactured by Sakai Chemical Industry Co., Ltd.
TEGO Dispers 750W: a polymeric dispersant manufactured by Evonik Industries AG TEGO Dispers 757W: a polymeric dispersant manufactured by Evonik Industries AG
TEGO Dispers 760W: a styrene/maleic acid-based dispersant manufactured by Evonik Industries AG
DEMOL EP: a polycarboxylate polymeric surfactant manufactured by Kao Corporation
DISPERBYK-102: a dispersant manufactured by BYK Additives & Instruments GmbH
FUJI SP A-54: an acrylic-based dispersant manufactured by Fuji Pigment Co., Ltd.
Water: ion-exchanged water
SUPERFLEX 460S: a urethane-based water-dispersible resin, manufactured by Dai-ichi Kogyo Seiyaku Co., Ltd.
SUPERFLEX 300: a urethane-based water-dispersible resin, manufactured by Dai-ichi Kogyo Seiyaku Co., Ltd.
ADEKA BONTIGHTER HUX-370: a urethane-based water-dispersible resin, manufactured by ADEKA Corporation
MOWINYL 966A: an acrylic-based water-dispersible resin, manufactured by The Nippon Synthetic Chemical Industry Co., Ltd.
NEOCRYL BT-62: a styrene/acrylic-based water-dispersible resin, manufactured by DSM Coating Resins D.V.
Diethylene glycol: manufactured by Wako Pure Chemical Industries, Ltd.
SURFYNOL 465: an acetylene-based surfactant, manufactured by Nissin Chemical Industry Co., Ltd.

<Measurement of Charge Density>

The charge density (Cd) of each of the inks 1 to 17 was measured by the streaming potential method. A colloid particle charge analyzing system (Model CAS, manufactured by AFG Analytic GmbH) was used to measure the charge density. The ink to be measured was diluted 100-fold with ion-exchanged water to prepare a sample, and titration was performed with a 0.0025 N poly(diallyldimethylammonium chloride) solution (manufactured by Wako Pure Chemical Industries, Ltd.) to measure the charge density. The charge densities of the inks 1 to 17 measured in this manner are shown in Tables 1 and 2.

TABLE 1

| | | Active | K | | | | | | | C | | |
|---|---|---|---|---|---|---|---|---|---|---|---|---|
| | Material | component | Ink 1 | Ink 2 | Ink 3 | Ink 4 | Ink 5 | Ink 6 | Ink 7 | Ink 8 | Ink 9 | Ink 10 |
| Pigment | BONJET BLACK CW-6 | 15.1% | 33.10 | 30.00 | | 30.00 | | | | | | |
| dispersion | BONJET BLACK CW-2 | 15.0% | | | 33.32 | | 30.00 | 27.00 | | | | |
| | CAB-O-JET 450C | 15.0% | | | | | | | | | 30.00 | 30.00 |
| Pigment | #960 | 100% | | | | | | | 5.00 | | | |
| | FASTOGEN Blue TGR | 100% | | | | | | | | 4.50 | | |
| Dispersant | TEGO Dispers 750W | 40.0% | | | | | | | 2.50 | | | |
| | TEGO Dispers 760W | 35.0% | | | | | | | | 2.57 | | |
| Dispersion | DISPERBYK-102 | 99.0% | | | | 2.00 | 2.00 | | | | | |
| assistant | FUJI SP A-54 | 40.0% | | 2.00 | | | | | 1.00 | 1.00 | 2.00 | |
| Water | Ion-exchanged water | — | 36.19 | 33.00 | 35.97 | 33.00 | 33.00 | 36.50 | 56.50 | 56.93 | 33.00 | 37.00 |
| Water- | SUPERFLEX 460S | 38.0% | 5.26 | | 5.26 | | | | | | | |
| dispersible | SUPERFLEX 300 | 38.0% | | | | | | 8.00 | | | | 8.00 |
| resin | ADEKA BONTIGHTER HUX-370 | 33.0% | | 8.00 | | 8.00 | 8.00 | | 8.00 | 8.00 | 8.00 | |
| | MOWINYL 966A | 45.0% | 4.44 | | 4.44 | | | 6.00 | | | | 4.00 |
| | NEOCRYL BT-62 | 40.0% | | 6.00 | | 6.00 | 6.00 | | 6.00 | 6.00 | 6.00 | |
| Water-soluble solvent | Diethylene glycol | — | 20.00 | 20.00 | 20.00 | 20.00 | 20.00 | 20.00 | 20.00 | 20.00 | 20.00 | 20.00 |
| Surfactant | SURFYNOL 465 | 100% | 1.00 | 1.00 | 1.00 | 1.00 | 1.00 | 2.50 | 1.00 | 1.00 | 1.00 | 1.00 |
| | Total | | 100.00 | 100.00 | 100.00 | 100.00 | 100.00 | 100.00 | 100.00 | 100.00 | 100.00 | 100.00 |
| | Charge density μeg/g | | 231 | 300 | 152 | 248 | 188 | 99 | 130 | 118 | 194 | 76 |

TABLE 2

| | | Active | M | | | Y | | | W |
|---|---|---|---|---|---|---|---|---|---|
| | Material | component | Ink 11 | Ink 12 | ink 13 | Ink 14 | Ink 15 | Ink 16 | Ink 17 |
| Pigment | CAB-O-JET 465M | 15.2% | | 30.00 | | | | | |
| dispersion | CAB-O-JET 260M | 10.0% | | | 45.60 | | | | |
| | CAB-O-JET 470Y | 15.1% | | | | 28.00 | | | |
| | CAB-O-JET 270Y | 10.0% | | | | | 40.00 | | |
| Pigment | CINQUASIA Magenta D4550J | 100% | 4.50 | | | | | | |
| | Inkjet Yellow 4GP | 100% | | | | | | 4.50 | |
| | R-21N | 100% | | | | | | | 10.00 |
| Dispersant | TEGO Dispers 757W | 40.0% | 2.25 | | | | | | |
| | TEGO Dispers 760W | 35.0% | | | | | | 2.57 | |
| | DEMOL EP | 24.0% | | | | | | | 0.40 |
| Dispersion | DISPERBYK-102 | 99.0% | 1.00 | 2.00 | | | | | |
| assistant | FUJI SP A-54 | 40.0% | | | | | | | |
| Water | Ion-exchanged water | | 57.25 | 33.24 | 21.40 | 40.80 | 26.00 | 59.93 | 56.60 |

TABLE 2-continued

| | | Active component | M Ink 11 | M Ink 12 | M ink 13 | Y Ink 14 | Y Ink 15 | Y Ink 16 | W Ink 17 |
|---|---|---|---|---|---|---|---|---|---|
| | Material | | | | | | | | |
| Water-dispersible resin | SUPERFLEX 460S | 38.0% | | | | | | | |
| | SUPERFLEX 300 | 38.0% | | | 8.00 | 6.00 | | 8.00 | 8.00 |
| | ADEKA BONTIGHTER HUX-370 | 33.0% | 8.00 | 7.51 | | | 8.00 | | |
| | MOWINYL 966A | 45.0% | | | 4.00 | 4.20 | | 4.00 | 4.00 |
| | NEOCRYL BT-62 | 40.0% | 6.00 | 6.25 | | | 5.00 | | |
| Water-soluble solvent | DIETHYLENE GLYCOL | — | 20.00 | 20.00 | 20.00 | 20.00 | 20.00 | 20.00 | 20.00 |
| Surfactant | SURFYNOL 465 | 100% | 1.00 | 1.00 | 1.00 | 1.00 | 1.00 | 1.00 | 1.00 |
| | Total | | 100.00 | 100.00 | 100.00 | 100.00 | 100.00 | 100.00 | 100.00 |
| | Charge density μeq/g | | 113 | 163 | 73 | 98 | 132 | 65 | 54 |

[Evaluation of Aqueous Inkjet Inks]
<Preparation and Evaluation of Printed Items>

The inks of each of the examples and comparative examples shown in Table 3 were loaded into a textile printer MMP8130 manufactured by Mastermind Inc., and an image was printed onto a 100% cotton T-shirt "PRINTSTAR 085-cvt" substrate in the manner described below.

Specifically, an image composed of a striped pattern of cyan (C), magenta (M) and yellow (Y) onto which some fine text and a solid printed block of black (K) had been drawn was printed onto the T-shirt substrate. The striped pattern of cyan (C), magenta (M) and yellow (Y) was a pattern in which a band of cyan (C), a band of magenta (M) and a band of yellow (Y), each having a width of 2 mm and a length of 120 mm, were printed in that order with no space between the bands, and this pattern was then repeated. Black (K) text of font size 12, 16, 20 and 24, and a black (K) solid block with a size of 10 mm×10 mm were then printed onto this striped pattern. Further, in those cases where a white (W) ink was also used, the white (W) ink was printed before printing the CMYK image.

Following printing, the obtained image was subjected to a thermal fixing treatment by heating at 160° C. for 60 seconds.

The printed item obtained in this manner was evaluated for color mixing and color feathering, and for color development using the methods described below. The results are shown in Table 3.

<Color Mixing, Color Feathering>

The color mixing and color feathering was evaluated against the following evaluation criteria by using a microscope to inspect the image for feathering at the edges of the printed black (K) text. Evaluation results of B and C are considered problematic in terms of practical application.

AA: no feathering of text
A: slight feathering of text, but not noticeable
B: noticeable feathering of text
C: considerable feathering of text <Color Development>

The color development was evaluated against the following evaluation criteria by measuring the OD value of the solid block of black (K). Measurement of the OD value was performed using an X-Rite eXact device manufactured by X-Rite, Inc. An evaluation result of C is considered problematic in terms of practical application.

AA: OD value greater than 1.07
A: OD value of 1.02 to 1.07
C: OD value less than 1.02

TABLE 3

| | | K | C | M | Y | W | CdK-Cd2 [μeq/g] | Color mixing-color feathering | Color development |
|---|---|---|---|---|---|---|---|---|---|
| Example 1 | Ink type | Ink 1 | Ink 8 | Ink 11 | Ink 15 | | 99 | A | A |
| | Cd value [μeq/g] | 231 | 118 | 113 | 132 | | | | |
| Example 2 | Ink type | Ink 1 | Ink 8 | Ink 13 | Ink 16 | | 113 | AA | A |
| | Cd value [μeq/g] | 231 | 118 | 73 | 65 | | | | |
| Example 3 | Ink type | Ink 1 | Ink 10 | Ink 11 | Ink 16 | | 118 | AA | AA |
| | Cd value [μeq/g] | 231 | 76 | 113 | 65 | | | | |
| Example 4 | Ink type | Ink 1 | Ink 10 | Ink 13 | Ink 15 | | 99 | A | A |
| | Cd value [μeq/g] | 231 | 76 | 73 | 132 | | | | |
| Example 5 | Ink type | Ink 2 | Ink 9 | Ink 12 | Ink 15 | | 106 | AA | A |
| | Cd value [μeq/g] | 300 | 194 | 163 | 132 | | | | |
| Example 6 | Ink type | Ink 2 | Ink 8 | Ink 11 | Ink 16 | | 182 | AA | AA |
| | Cd value [μeq/g] | 300 | 118 | 113 | 65 | | | | |
| Example 7 | Ink type | Ink 5 | Ink 10 | Ink 13 | Ink 14 | | 90 | A | A |
| | Cd value [μeq/g] | 188 | 76 | 73 | 98 | | | | |
| Example 8 | Ink type | Ink 4 | Ink 10 | Ink 12 | Ink 14 | | 85 | A | A |
| | Cd value [μeq/g] | 248 | 76 | 163 | 98 | | | | |
| Example 9 | Ink type | Ink 1 | Ink 8 | Ink 13 | Ink 16 | Ink 17 | 113 | AA | AA |
| | Cd value [μeq/g] | 231 | 118 | 73 | 65 | 54 | | | |
| Comparative Example 1 | Ink type | Ink 1 | Ink 10 | Ink 12 | Ink 14 | | 68 | B | A |
| | Cd value [μeq/g] | 231 | 76 | 163 | 98 | | | | |
| Comparative Example 2 | Ink type | Ink 5 | Ink 8 | Ink 13 | Ink 14 | | 70 | B | A |
| | Cd value [μeq/g] | 188 | 118 | 73 | 98 | | | | |

TABLE 3-continued

|  |  | K | C | M | Y | W | CdK-Cd2 [μeq/g] | Color mixing-color feathering | Color development |
|---|---|---|---|---|---|---|---|---|---|
| Comparative Example 3 | Ink type | Ink 5 | Ink 9 | Ink 12 | Ink 15 |  | −6 | C | C |
|  | Cd value [μeq/g] | 188 | 194 | 163 | 132 |  |  |  |  |
| Comparative Example 4 | Ink type | Ink 4 | Ink 9 | Ink 12 | Ink 14 |  | 54 | B | C |
|  | Cd value [μeq/g] | 248 | 194 | 163 | 98 |  |  |  |  |
| Comparative Example 5 | Ink type | Ink 3 | Ink 10 | Ink 11 | Ink 16 |  | 39 | C | C |
|  | Cd value [μeq/g] | 152 | 76 | 113 | 65 |  |  |  |  |
| Comparative Example 6 | Ink type | Ink 7 | Ink 8 | Ink 11 | Ink 16 |  | 12 | C | C |
|  | Cd value [μeq/g] | 130 | 118 | 113 | 65 |  |  |  |  |
| Comparative Example 7 | Ink type | Ink 6 | Ink 10 | Ink 13 | Ink 16 |  | 23 | C | C |
|  | Cd value [μeq/g] | 99 | 76 | 73 | 65 |  |  |  |  |
| Comparative Example 8 | Ink type | Ink 1 | Ink 10 | Ink 12 | Ink 14 | Ink 17 | 68 | B | A |
|  | Cd value [μeq/g] | 231 | 76 | 163 | 98 | 54 |  |  |  |

In each of Examples 1 to 8, in which printing was performed using black (K), cyan (C), magenta (M) and yellow (Y) inks, the Cd value (CdK) for the black ink was the highest among the Cd values for all the aqueous inkjet inks in the ink set, and the absolute value of the difference between the Cd value (CdK) for the black ink and the Cd value (Cd2) for the aqueous inkjet ink having the second highest Cd value was 80 μeq/g or greater. As shown in Table 3, the evaluation result for color mixing was either A or AA for each of Examples 1 to 8, indicating little feathering of the fine text. Further, the evaluation result for the color development was also A for each example, a result indicating no problems.

In Examples 2, 3, 5, 6 and 9, the absolute value of the difference between CdK and Cd2 was 100 μeq/g or greater, and in each of these examples, the evaluation result for color mixing was AA, indicating a particularly low level of color mixing.

In Example 9 in which printing was also performed using a white (W) ink, the Cd value (CdK) for the black ink was the highest among the Cd values for all the aqueous inkjet inks in the ink set including the white (W) ink, and the absolute value of the difference between the Cd value (CdK) for the black ink and the Cd value (Cd2) for the aqueous inkjet ink having the second highest Cd value was 80 μeq/g or greater. As shown in Table 3, in Example 9, an image having superior color development and no color mixing was able to be formed.

In contrast, none of Comparative Examples 1 to 8 exhibited results that indicated no practical problems for either color mixing or color development.

According to embodiments of the present invention, it is possible to provide an aqueous inkjet ink set for textile printing with which it is possible to produce a printed item having superior black color development and reduced color mixing and feathering between the black and other colors, even when printing was performed by inkjet printing to a fabric.

Embodiments of the present invention include the followings. However, the present invention is not limited to the following embodiments.

<1> An aqueous inkjet ink set for textile printing comprising two or more aqueous inkjet inks including a black ink, wherein among the charge density Cd values measured by the streaming potential method for the two or more aqueous inkjet inks, the Cd value (CdK) for the black ink is the highest, and the absolute value of the difference between the Cd value (CdK) for the black ink and the Cd value (Cd2) for the aqueous inkjet ink having the second highest Cd value is 80 μeq/g or greater.

<2> The aqueous inkjet ink set for textile printing according to <1>, wherein the absolute value of the difference between the Cd value (CdK) for the black ink and the Cd value (Cd2) for the aqueous inkjet ink having the second highest Cd value is 100 μeq/g or greater.

<3> The aqueous inkjet ink set for textile printing according to <1> or <2>, wherein at least one of the two or more aqueous inkjet inks comprises a water-dispersible urethane resin and at least one water-dispersible resin selected from the group consisting of water-dispersible (meth)acrylic resins and water-dispersible styrene/(meth)acrylic resins.

<4> The aqueous inkjet ink set for textile printing according to any one of <1> to <3>, wherein each of the two or more aqueous inkjet inks contains 1 to 30% by mass of a pigment relative to the total mass of the aqueous inkjet ink.

<5> A method for producing a printed item using the aqueous inkjet ink set for textile printing according to <1>, the method comprising printing the two or more aqueous inkjet inks onto a substrate using an inkjet recording method.

<6> The method according to <5>, wherein the absolute value of the difference between the Cd value (CdK) for the black ink and the Cd value (Cd2) for the aqueous inkjet ink having the second highest Cd value is 100 μeq/g or greater.

<7> The aqueous inkjet ink set for textile printing according to <5> or <6>, wherein at least one of the two or more aqueous inkjet inks comprises a water-dispersible urethane resin and at least one water-dispersible resin selected from the group consisting of water-dispersible (meth)acrylic resins and water-dispersible styrene/(meth)acrylic resins.

<8> The aqueous inkjet ink set for textile printing according to any one of <5> to <7>, wherein each of the two or more aqueous inkjet inks contains 1 to 30% by mass of a pigment relative to the total mass of the aqueous inkjet ink.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An aqueous inkjet ink set for textile printing comprising two or more aqueous inkjet inks including a black ink, wherein among charge density Cd values measured by a streaming potential method for the two or more aqueous inkjet inks, a Cd value (CdK) for the black ink is highest, and an absolute value of a difference between the Cd value (CdK) for the black ink and a Cd value (Cd2) for an aqueous inkjet ink having a second highest Cd value is 80 μeq/g or greater.

2. The aqueous inkjet ink set for textile printing according to claim 1, wherein an absolute value of a difference between the Cd value (CdK) for the black ink and the Cd value (Cd2) for the aqueous inkjet ink having the second highest Cd value is 100 μeq/g or greater.

3. The aqueous inkjet ink set for textile printing according to claim 1, wherein at least one of the two or more aqueous inkjet inks comprises a water-dispersible urethane resin and at least one water-dispersible resin selected from the group consisting of a water-dispersible (meth)acrylic resin and a water-dispersible styrene/(meth)acrylic resin.

4. The aqueous inkjet ink set for textile printing according to claim 1, wherein each of the two or more aqueous inkjet inks comprises 1 to 30% by mass of a pigment relative to a total mass of the aqueous inkjet ink.

5. A method for producing a printed item using the aqueous inkjet ink set for textile printing according to claim 1, the method comprising printing the two or more aqueous inkjet inks onto a substrate using an inkjet recording method.

6. The method according to claim 5, wherein an absolute value of a difference between the Cd value (CdK) for the black ink and the Cd value (Cd2) for the aqueous inkjet ink having the second highest Cd value is 100 μeq/g or greater.

7. The method according to claim 5, wherein at least one of the two or more aqueous inkjet inks comprises a water-dispersible urethane resin and at least one water-dispersible resin selected from the group consisting of a water-dispersible (meth)acrylic resin and a water-dispersible styrene/(meth)acrylic resin.

8. The method according to claim 5, wherein each of the two or more aqueous inkjet inks comprises 1 to 30% by mass of a pigment relative to a total mass of the aqueous inkjet ink.

* * * * *